Figure 1:
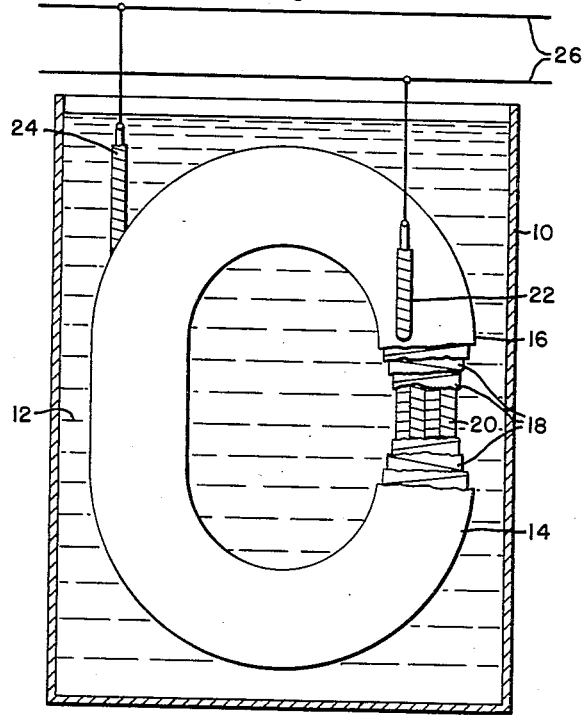

April 22, 1952

W. M. TRIGG 2,594,096

PROCESS FOR TREATING WINDINGS WITH
COMPLETELY-REACTIVE COMPOSITIONS
Filed Jan. 21, 1949

WITNESSES:

INVENTOR
Warren M.Trigg.
BY
Frederick Shapoe
ATTORNEY

Patented Apr. 22, 1952

2,594,096

UNITED STATES PATENT OFFICE 2,594,096

PROCESS FOR TREATING WINDINGS WITH COMPLETELY-REACTIVE COMPOSITIONS

Warren M. Trigg, Wilkinsburg, Pa., assignor to Westinghouse Electric Corporation, East Pittsburgh, Pa., a corporation of Pennsylvania Application January 21, 1949, Serial No. 71,846

2 Claims. (Cl. 117—93)

This invention relates to the treating of electrical windings with completely-reactive compositions.

Numerous difficulties are encountered in treating electrical apparatus with completely-reactive varnish compositions. While considerable variation in processing is possible with conventional varnishes embodying a solvent requiring evaporation before the varnish is cured, completely-reactive compositions, on the other hand, require highly specific schedules of application to insure good impregnation of electrical members therewith. Many of the conventional practices found satisfactory in treating electrical members with conventional volatile solvent varnishes cannot be employed with solvent reactive compositions due to the nature of the solvent reactive compositions and because of the desire to secure the utmost benefits from the completely-reactive compositions. Furthermore, completely-reactive compositions, in most instances, are much more costly than the volatile solvent type of composition; and, consequently, the completely-reactive compositions must produce a better product to justify their use.

The prime consideration recommending the use of the completely-reactive compositions is the possibility under suitable process conditions, of securing complete filling of all the interstices, voids, and spaces within electrical windings whereby better heat dissipation, resistance to moisture and the like, and improved electrical insulation is secured as contrasted to the necessarily incomplete impregnation obtained with varnishes containing a solvent requiring evaporation. These differences in properties and in the results desired, accordingly, necessitate a radical departure from conventional practice for the satisfactory use of completely reactive polymerizable compositions. Electrical members treated with a volatile solvent varnish are customarily drained; the step of drainage is unnecessary and, in fact, is to be avoided with completely-reactive compositions. Furthermore, where electrical windings treated with a volatile solvent varnish are often permitted to dry in air so that volatile solvent is evaporated before the varnish cures, this procedure is to be avoided in applications of completely-reactive compositions. Indicative of such departure from the usual varnishing processes is the difference between the conventional varnish dipping, draining, and baking cycle employed with conventional volatile solvent varnishes and the process set forth in the C. F. Hill et al. Patent 2,414,525, which has been found to be quite successful in applying a completely-reactive composition. However, the process of the C. F. Hill et al. patent is not suitable for many forms of electrical apparatus even though it is widely used in the trade for certain types of members.

The object of the present invention is to provide for the controlled introduction and polymerization of completely-reactive compositions in electrical apparatus.

A further object of the invention is to provide for producing and polymerizing completely reactive compositions in the winding portions only of electrical apparatus.

A still further object of the invention is to provide a process for completely impregnating predetermined portions of electrical apparatus with a completely-reactive composition.

Figure 2:
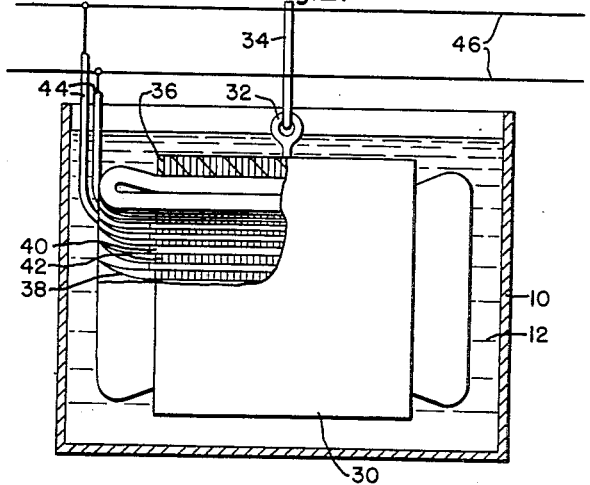

Other objects of the invention will in part be obvious and will in part appear hereinafter. For a better understanding of the nature and objects of the invention, reference should be had to the following detailed description and drawing, in which:

Figure 1 is a view in elevation, partly in section and partly broken, illustrating the treatment of a coil; and Fig. 2 is a view in vertical elevation, partly in section, illustrating a modified form of apparatus being treated in accordance with the invention.

In accordance with the present invention, electrical members including an electrical winding as a part thereof, are subjected to a process which controllably introduces a predetermined amount of a completely-reactive composition into the windings and causes polymerization of the composition therein so that the interstices of the winding may be substantially completely filled with the composition. Portions of the member, other than the electrical winding thereof, are merely coated with a thin film of the composition so that they are not heavily coated or acquire an excessively built-up amount of the polymerizable composition.

Specifically, the invention comprises the steps of immersing the windings of the electrical member in a body of a completely-reactive fluid resinous composition that is capable of polymerizing to a non-flowable gel on being heated above a predetermined temperature and passing an electric current through the windings while they are so immersed so that the winding is heated above the predetermined temperature; and the completely-reactive composition within the interstices of the winding and immediately adjacent thereto is caused to polymerize to a non-flowable gel for a selected period of time until a required thickness of gelled composition has been formed. Upon withdrawing the member from the composition after such heating, it will be found to have present in and around the winding a substantially complete and solid gel of the completely-reactive composition, while the other portions of the member that were not subjected to this temperature carry a thin surface film of the fluid composition in a substantially unpolymerized state. Thereafter, the member may be heated in any suitable manner to complete the polymerization of the applied completely-reactive composition to cure it to the desired degree of polymeriaztion. Practically all of the completely-reactive compositions are of such a nature that they may be polymerized to hard resinous bodies, which in many cases are thermoset.

Ordinarily, electrical members suitable for processing in accordance with the invention will be at atmospheric temperatures: that is, of the order of 25° C. to 35° C. However, the members may be heated moderately for the purpose of drying them. The temperature to which the members are preheated must be carefully controlled in accordance with the desired impregnation of the windings of the electrical member. Thus, the member may be heated at most only to a temperature slightly above the temperature at which the completely-reactive composition will polymerize to a gel. Depending on the mass of the member, the preheating temperature ordinarily may be approximately 10° above the polymerization or gelation temperature of the completely-reactive composition but in no event should the temperature of the member exceed the boiling point of any component of the composition. Excessive preheating temperatures may cause evaporation of portions of the completely-reactive composition since such completely-reactive compositions often consist of a relatively-volatile polymerization monomer, for example, vinyl acetate. Evaporation of some of the vinyl acetate from the composition will change its characteristics and result in non-uniform composition from batch to batch of members being treated in the composition. A controlled limited degree of preheating may reduce the time of treatment required to secure a properly-impregnated electrical winding; and to this extent, preheating may be advantageous.

Electrical members suitable for treating in accordance with the process of the present invention may include any type of coil; for example, hairpin coils, field coils, rotor coils, bobbin-wound coils, pancake coils, and shell-type coils. Other types of members that may be employed are stators, rotors, transformer coil and core assemblies, and electromagnetic coils, such as solenoids and the like. The electrical windings may be composed of an electrical conductor such as copper wire, which may be enameled or covered with cotton, asbestos, glass fiber, paper, silk or any combination thereof. Furthermore, the assembled conductors forming a winding or coil may be covered with insulating material such as mica tape, glass, cotton or asbestos tape, or any combination of these or other forms of wrapping known to the art. The conductors may have been treated with a conventional varnish composition containing an evaporable solvent previous to being treated in accordance with the present invention.

Completely-reactive compositions suitable for use in the process may include any fluid polymerizable composition that, upon being heated to a predetermined temperature, polymerizes first, to a non-flowable gel and then, into a relatively-hard resinous body. The fluid resinous composition may comprise a single polymerizable component such, for example, as diallyl phthalate, diallyl succinate, diallyl maleate, diallyl pate, allyl alcohol, methallyl acrylate, diallyl ether, allyl acrylate, and allyl crotonate. It will be noted that such compositions comprise at least one unsaturated group $>C=C<$ capable of vinyl-type polymerization. The best results have been secured with monomers containing two or more of these unsaturated groups capable of polymerization upon being subjected to heat. It will be understood that mixtures of any two or more of the polymerizable monomers may be employed. Numerous other multi-component completely-reactive compositions are known to the art. Such compositions include, in many cases, an unsaturated resinous component—particularly an unsaturated alkyd resin—and an unsaturated polymerizable liquid monomer. Particularly good results have been secured by employing as the resinous alkyd resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a polyhydric alcohol such as glycol, glycerol, or pentaerythritol or mixtures thereof. Castor oil has been employed successfully in the reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, the unsaturated alpha-beta dicarboxylic acid or anhydride may be replaced with up to 90% of the weight thereof of a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols—particularly with dicarboxylic acids instead of their anhydrides.

The alkyd esters may be dissolved in a liquid unsaturated monomer having the group $$H_2C=C<$$

Suitable liquid unsaturated polymerizable monomers are: monostyrene, alpha methyl styrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene and divinyl benzene, or mixtures of two or more of any of these monomers.

Electrical members or electrical apparatus comprising one or more electrical windings are processed in accordance with the invention as follows. The electrical windings are connected to a source of electrical current, either alternating current or direct current, of a suitable voltage to pass through the windings a current adequate to heat the windings up within a reasonable period of time to a temperature at which the completely-reactive composition will polymerize into a gel. It has been found that for many purposes, direct current has advantages over alternating current. The member with the winding connected into the electrical circuit may have been warmed or preheated either in an oven or by some other external source of heat or, if desired, by passing the electrical current through the winding at such a rate that the winding is heated to a moderate temperature ordinarily below the temperature at which the composition would gel; but it may be heated to a temperature slightly above the polymerization temperature of the composition since when the composition is applied to the winding, it will immediately cool the winding and thereby reduce its temperature before any substantial amount of gelation has taken place. The winding, whether at room temperature or above, is then immersed in the completely-reactive composition thereby enabling the composition to penetrate into the interstices of the winding and to fill any voids or spaces in the winding. It may be advantageous at times to place the winding within a vacuum tank and to subject it first to a vacuum to remove moisture, air, and the like, and then flooding it with the composition with pressure applied to the composition to facilitate penetration of the composition into the winding interstices. The composition will penetrate more rapidly into the winding if vacuum has been applied previously, though I have secured exceptionally thorough impregnation of windings without the use of a vacuum.

After the completely-reactive composition has been applied to the electrical member so that it has thoroughly penetrated the windings, electrical current is caused to flow in the winding to heat up the winding. The rate of heating is not critical, but expediency will ordinarily recommend a high rate of heating in order that the process will be most promptly effected. In many cases, the member may be removed from the completely-reactive composition and examined visually from time to time to determine the amount of polymerized gelled composition on the winding. When the accumulation of gelled composition on the winding appears to have covered the windings to a desired thickness, the electrical member is removed from the bath of the composition. The composition remaining within the bath will be substantially unaffected by the heating since any composition that has been subjected to the gelatin temperature will have polymerized around the winding and will be withdrawn with it. Parts of the electrical member other than the winding will not have been heated to any appreciable extent, and it has been found that magnetic cores, for example, adjacent the winding will have substantially no polymerized composition thereon. Only a thin layer of the liquid unpolymerized reactive composition will be present as a coating on the parts other than the electrical winding. Polymerization of the gelled composition and any adherent coating of the liquid ungelled reactive composition may be cured to a hard resinous insulating product by the application of further heat to the electrical member. Passing the electrical member through a bank of infra-red heating lamps where the electrical member may be subjected to a temperature above 100° C. for fifteen minutes or longer is one suitable method of completing the polymerization or curing of the completely-reactive composition. The treated electrical members may be placed in a gas, steam, or electrically-heated oven for a period of time, and the curing of the varnish may be accomplished in this manner. Numerous types of equipment for this purpose are well known and may be employed as seems appropriate.

Referring to Fig. 1 of the drawing, there is illustrated the application of the process of the invention to a coil comprising a plurality of turns of an electrical conductor. As illustrated in this figure, a tank 10 containing a body of completely-reactive composition 12 of the type specified hereinbefore has immersed therein a coil 14. The coil 14 comprises an outer covering 16 which may be cotton tape, glass fabric, asbestos tape or the like, applied over insulation 18, which may be mica tape insulation or the like. Enclosed within the covering 16 and insulation 18 are the conductor turns 20 composed of an electrical conductor with individual insulation which may be wire enamel or cotton tape or any combination of insulation known in the art. The coil leads 22 and 24 extending from the wrapping 16 are connected to conductors 26 supplied from a suitable source of electrical energy. The process applied to the winding 14 comprises immersing the winding 14 while at room temperature or slightly above, but not exceeding the polymerization or gelling temperature of the composition 12 by any substantial margin, for a period sufficient to permit the composition 12 to penetrate the winding, then causing electrical current to flow from the line 26 through the leads 22 and 24 to cause the conductor turns 20 to heat up. The composition 12 will have penetrated into the interstices of the winding 14 to saturate not only the covering 16 and the mica tape 18, but also the conductor turns 20 and to fill all the interstices substantially completely. As the temperature of the conductor turns 20 increases, the completely-reactive composition immediately adjacent thereto begins to gel, and the composition progressively builds up and gels from the conductors. The gelation spreads through the tape and wrapping, and eventually composition around the exterior of the winding also gels. Depending on how heavy an external coating composition is desired, the immersion may be continued as long as required. By withdrawing the winding from the container 10, the build-up of gelled composition is terminated. In this manner the quantity of composition introduced into the winding is controlled.

Any gelled composition will adhere to the exterior of the winding and there will be little drainage except for some slight amount of ungelled liquid composition on the exterior of the winding. It will be appreciated that the polymerization of the composition will be most advanced within the interstices of the conductor turns 20, and the lowest polymers will be at the exterior of the winding. By placing the winding in an oven or subjecting it to some external source of heat, the polymerization of the composition in the gelled state may be advanced to a hard cured polymer. In some cases, the passage of current through the turns 20 may be continued while external heat is also supplied thereby effecting the most rapid curing of the composition.

Any of the composition 12 not gelled by the heat developed within the winding 14 will remain in the tank and is suitable for treating additional coils. A slight addition of the completely-reactive composition may be made at intervals to replenish the amount that has been taken out by a previously immersed and treated winding 14. For some purposes, it may be desirable to refrigerate the tank 10 to prevent a reaction from taking place and setting up the resin which may take place if the composition 12 becomes too warm—particularly if substantial amounts of polymerization catalysts are present.

The composition 12 preferably contains a polymerization catalyst. Suitable catalysts include peroxides, ozonides, perhalides and peracids. Examples of suitable catalysts are benzoyl peroxide, tert-butyl perbenzoate, tert-butyl hydro-peroxide, di-t-butyl peroxide, di-t-butyl di-perphthalate, 1-hydroxy cyclohexyl hydroperoxide-1 and ascaridol. 0.1% or less of the polymerization catalysts, based on the weight of the composition, may be employed, but more rapid reaction is obtained if the amount of the catalyst is higher—preferably from ½% to 2% by weight. The polymerization catalyst, when admixed in the completely-reactive composition, may cause it to increase in viscosity slowly at ordinary temperatures; and, therefore, it may be desirable to cool the catalyzed composition to a temperature of 10° C. or lower thereby increasing the tank life of the composition.

In some instances, it has been found effective to immerse the winding into a solution of a polymerization catalyst in a volatile organic solvent; thus benzoyl peroxide dissolved in toluene in the proportion of 1% to 5% by weight of the peroxide may be applied to a winding and the winding removed therefrom and heated to evaporate the toluene thereby depositing a thin film or coating of the peroxide over the surfaces of the winding. When immersed in a batch of the uncatalyzed reactive composition and heated, the winding will acquire a gelled coating of a polymer because of the catalyst present within the winding. In this way, the reactive composition may be maintained at considerably higher temperatures than would be normally practical without undesirable gelation or other impairment of the properties of the composition in the tank occurring. The following example is typical of the practice of the invention.

Example I

A composition was prepared by dissolving 65 parts by weight of the reaction product of equimolar proportions of maleic anhydride and propylene glycol reacted to an acid number of below 70, and 35% by weight of monostyrene applied as a solvent thereto. The viscosity of the composition was approximately 200 centipoises. The composition was admixed with 1% by weight of tert-butyl-perbenzoate. A field coil weighing approximately 2 pounds and comprising enameled wire wrapped with two layers of mica tape and finally wrapped with one layer of half-lapped glass fiber tape was connected to a source of direct current at 30 volts. The coil was immersed in the catalyzed composition of propylene glycol-maleate and monostyrene, and a current of 25 amperes was passed through the coil. The coil heated rapidly and in five minutes had built up gelled polymer completely filling the interstices and extending solidly through the mica tape and glass fiber covering. The coil so treated was withdrawn from the bath at the end of the five minutes and then placed within a hot air oven where it was baked for one hour at a temperature of 135° C. Examination revealed that the coil was solidly and completely impregnated with hard, cured composition. It was found to be void free when cut apart.

Example II

A coil similar to that of Example I was dipped into a tank of diallyl phthalate catalyzed with 1% by weight of benzoyl peroxide. Within six minutes after passing 25 amperes D. C. at 30 volts, the coil was completely impregnated with gelled polymer. After removal from the tank of diallyl phthalate, with a brief drainage to remove unpolymerized diallyl phthalate, on the surface, the coil was baked in an oven for an hour at 135° C. This coil also was found to be solidly impregnated with hard cured resin. The drainage from both coils in these Examples I and II was merely a superficial dripping of unpolymerized composition and none of the gelled polymer drained thereoff.

For an illustration of the practice of the invention applied to apparatus including electrical windings in combination with parts requiring no impregnation, or at most, only a surface coating of the resin, reference should be had to Fig. 2 of the drawing. In the tank 10 containing the completely-reactive composition 12, there is immersed a stator 30 supported from an eye bolt 32 by means of a hanger 34. The stator 30 comprises a magnetic core 36 composed of a plurality of laminations of magnetic sheet material within which there are disposed a plurality of windings 38. The internal bore 42 of the stator must be maintained within close dimensional tolerances to accommodate a rotating armature. Therefore, any substantial thickness of varnish or resin on the surface of the bore 42 is undesirable. Slot sticks 40 retain the windings within slots in the magnetic core. Leads 44 from the winding 38 are connected to a line 46 supplying electrical energy to the winding. After the stator 30 is immersed within the composition 12 for a sufficient time to allow the composition to penetrate it thoroughly, electrical current is allowed to flow from the line 46 into the leads 42 and thence to the windings 38; the windings 38 heat up to a temperature at which the composition 12 will begin to gel. The composition nearest the windings 38 gels first, and such gelation spreads out from the heated conductors thereby building up a progressively thicker accumulation of polymerized composition. However, the magnetic core 36 does not heat up, particularly if direct current is supplied from line 46. Therefore, substantially no polymerized resin will be present upon the magnetic core. The slots of the magnetic core will build up a body of polymerized gelled resin, and then the stator 30 may be withdrawn from the bath 12 after a brief drainage to permit excess composition to drain from the surface of the magnetic core 36 and any superficial unpolymerized resin from the windings 38. The stator may be passed through an infra-red heating lamp oven or into a hot air oven or the like and polymerization of all of the composition to a hard state effected. The slight amount of composition on the magnetic core 36 serves to protect it from corrosion and, therefore, is advantageous. However, the magnetic core, particularly the bore 42, will be found to be substantially free from any heavy deposits of the resinous composition except for a very thin surface coating. The following examples are typical of treatment of apparatus in accordance with the embodiment shown in Fig. 2 of the drawing.

Example III

A completely-reactive composition was prepared by dissolving (a) 30 parts by weight of a castor oil maleate derived by reacting 100 parts of castor oil with 30 parts of maleic anhydride at 120° C. for two hours, and (b) 35 parts by weight of a linseed oil modified castor oil maleate resin derived by reacting at a temperature of from 175° C. for eight hours the following ingredients: linseed oil, 16 parts; castor oil, 15.8 parts; maleic anhydride, 23.2 parts, in (c) 35% by weight of monostyrene. For a polymerization catalyst, there was introduced ½% by weight of benzoyl peroxide into this composition. Into the bath of completely-reactive composition so prepared, there was immersed a stator weighing 1 pound composed of approximately ⅞ pound of magnetic lamination and ⅛ pound of No. 18 enameled wire. The leads to the winding of the stator were connected to a source of direct current. Previous to immersing, direct current was permitted to flow through the windings for two minutes to heat the windings up and to dry the stator. The temperature of the windings was approximately 100° C. The preheated stator was then immersed in the reactive composition for four minutes additional while continuing the flow of electrical current at 5 amperes. When withdrawn from the composition at the end of this time, the windings were found to be completely enclosed in a solid body of gelled composition with the magnetic laminations, however, being coated with a very thin layer of the unpolymerized composition adhering thereto solely by surface wetting. The stator was baked in an oven for thirty minutes at 125° C., and the windings were found to be embedded in a hard, tough body of resin with no voids present. The slots in the magnetic core, in which the windings were placed, were completely filled with the polymerized resin composition.

Example IV

An unsaturated ester was prepared by reacting 600 parts by weight of tall oil, 82 parts by weight of pentaerythritol and 76 parts by weight of propylene glycol. Heating was continued at 150° C. for five hours at the end of which time the acid number was 7; then 98 parts of maleic anhydride was added and the reaction continued at 150° C. for three and one-half hours additionally. The acid number at the end of this time was 7.5. After cooling, 65 parts by weight of the resulting unsaturated resinous ester product was admixed with 35 parts by weight of monostyrene and with 0.5% by weight of tert-butyl-hydroperoxide. This composition gels in two minutes at 100° C.

There was immersed within the composition of this example a stator weighing approximately 10 pounds with windings comprising ½ pound of enameled wire, part of the wire being cotton covered to function as the starter winding. The winding was connected to a source of direct current at 70 volts. After immersion in the composition, electric current was permitted to flow at 40 amperes through the winding for five minutes. At the end of this time, it was found that the composition had completely filled the interstices of the windings and the slots without, however, having formed any substantial amount of polymer on the magnetic core. The stator was withdrawn from the composition at the end of this time, drained for a few seconds, and baked in an oven for one hour at 140° C. When examined after the baking the resin had impregnated the windings and had filled them completely without, however, having formed any appreciable thickness of coating on the iron, thereby eliminating any necessity for cleaning or wiping the bore of the stator.

Example V

Into the composition of Example IV there was immersed a stator weighing 50 pounds carrying a winding composed of cotton covered enameled wire. A direct current of 25 amperes at 80 volts was passed through the winding for ten minutes during immersion. The stator was removed from the composition, permitted to drain for half a minute to remove any superficial composition, and after baking two hours at 135° C., the composition was found to have formed a hard, tough resinous matrix embedding all the conductors and filling the slots of the more substantially completely.

Numerous other compositions are suitable for the practice of the process of this invention, and the following examples are illustrative of such other completely-reactive compositions:

*Example VI.*—The reaction product of 4 moles of maleic anhydride, 1 mole of adipic acid, and 5 moles of ethylene glycol, dissolved in an equal weight of diallyl phthalate.

*Example VII.*—The reaction product of 50 parts by weight of maleic anhydride, and 54 parts by weight of diethylene glycol dissolved in monomeric vinyl acetate, in the proportion of 80 parts of the diethylene glycol maleate and 20 parts of the vinyl acetate.

*Example VIII.*—Fumaric acid, 50 parts, and diethylene glycol, 50 parts, were reacted and the product dissolved in monostyrene.

*Example IX.*—The reaction product of diethylene glycol, 13 parts; maleic anhydride, 28 parts; and tung oil, 7.5 parts, dissolved in methyl methacrylate in equal parts.

*Example X.*—Diethylene glycol, 30 parts; maleic anhydride, 13 parts, and phthalic anhydride, 22 parts, were reacted and dissolved in diallyl maleate in the proportion of 3 parts of the ester to 1 of the diallyl maleate.

*Example XI.*—A mixture of 40 parts of diallyl phthalate and 60 parts of ethylene glycol maleate and 0.2 parts of benzoyl peroxide, forms a composition that gels in two minutes at 120° C.

*Example XII.*—A mixture of 13 parts of ethylene glycol maleate dissolved in 7 parts of methallyl alcohol produces a solution that gels in approximately ten minutes at 90° C.

Heat may be generated in windings, especially in windings associated with a magnetic core, such as a stator, by short circuiting the windings of the stator and placing the stator in a tank of reactive resin in which is present a large coil in which the stator will fit, and applying an alternating current to the large coil so that the short circuited stator windings have an induced current flowing in them thereby heating them rapidly. The term "passing an electric current through the winding" is intended to include both such induced electrical currents as well as current flowing by direct connection to an external source. Obviously, the gelation temperature will not only depend on the components of the particular completely-reactive composition but also on the amount of catalyst present. Some completely reactive compositions will gel in two minutes at 50° C. while others may require a temperature of as much as 140° C. to gel to the same extent. Therefore, no particular temperature can be specified.

Since certain changes may be made in the above invention and different embodiments of the invention may be made without departing from the scope thereof, it is intended that all matter contained in the above described disclosure shall be interpreted as illustrative and not in a limiting sense.

I claim as my invention:

1. In the process of applying an insulating resinous composition to an electrical member comprising a magnetic core and winding to impregnate the winding while providing only thin film of the composition on the core, the steps comprising immersing the member in a body of a completely-reactive fluid resinous composition polymerizable to a gel when heated above a predetermined temperature, the member being below the predetermined temperature when immersed so that the fluid composition readily penetrates the winding, passing direct electric current through the winding while it is immersed in the composition to heat it and the applied composition above the predetermined temperature to gel the composition, heating being continued until a desired amount of the composition has gelled on the winding with substantially no gelled composition being present on the magnetic core surfaces out of immediate contact with the winding, removing the member while heated from the body of fluid composition, draining the member to remove excess fluid composition thereby leaving only a thin film of the fluid composition on said core surfaces, and heating the entire member to polymerize all the composition thereon to a cured state.

2. In the process of applying a predetermined amount of an insulating resin to a winding comprising a conductor and having interstices, the steps comprising immersing the winding in a body of a completely-reactive, fluid resinous composition which will polymerize to a non-flowable gel when heated above a predetermined temperature, the winding being below the said predetermined temperature when first immersed in the fluid resinous composition so that the composition will freely penetrate into the interstices of the winding, thereafter progressively polymerizing a predetermined amount of the fluid resinous composition in and adjacent to the immersed winding to a non-flowable gel, said polymerization being effected by passing an electrical current through the conductor to heat the winding to a temperature above the predetermined temperature for a period of time whereby a limited amount of the composition in and adjacent to the winding is polymerized to a gel, withdrawing the so-treated winding while it is maintained at the predetermined temperature from the body of the fluid composition, draining ungelled composition from the winding, and continuing the heating of the winding and the applied gelled composition thereon to polymerize the gelled composition to a cured state.

WARREN M. TRIGG.

REFERENCES CITED

The following references are of record in the file of this patent:

UNITED STATES PATENTS

| Number | Name | Date |
| --- | --- | --- |
| 1,675,419 | Myers | July 3, 1928 |
| 2,442,183 | Stearns | May 25, 1948 |
| 2,464,568 | Flynn | Mar. 15, 1949 |

FOREIGN PATENTS

| Number | Country | Date |
| --- | --- | --- |
| 515,891 | Great Britain | 1939 |